(12) United States Patent
Cohen

(10) Patent No.: US 9,516,472 B2
(45) Date of Patent: Dec. 6, 2016

(54) METHOD AND SYSTEM FOR EVALUATING A USER RESPONSE TO A PRESENCE BASED ACTION

(71) Applicant: Verizon Patent and Licensing Inc., Arlington, VA (US)

(72) Inventor: Seth Cohen, Cupertino, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 123 days.

(21) Appl. No.: 14/512,019

(22) Filed: Oct. 10, 2014

(65) Prior Publication Data

US 2016/0105772 A1    Apr. 14, 2016

(51) Int. Cl.
*H04W 4/02* (2009.01)
*G06Q 40/00* (2012.01)
*H04L 29/08* (2006.01)

(52) U.S. Cl.
CPC ............. *H04W 4/028* (2013.01); *G06Q 40/00* (2013.01); *H04L 67/18* (2013.01); *H04L 67/22* (2013.01); *H04W 4/027* (2013.01)

(58) Field of Classification Search
CPC ....... H04W 4/028; H04W 4/027; H04L 67/18; H04L 67/22; G06Q 40/00
See application file for complete search history.

(56) References Cited

U.S. PATENT DOCUMENTS

2013/0288715 A1* 10/2013 Shieh .................... H04W 4/043
                                                        455/456.3
2015/0256423 A1*  9/2015 Stearns .................. H04L 67/22
                                                        709/224

* cited by examiner

*Primary Examiner* — Chuong A Ngo

(57) ABSTRACT

An approach and system for determining a level of effectiveness of a device action performed in response to the presence of a user is described. The system identifies a user associated with a presence signal transmitted by a transmitting object in use by the user during an event. The system also initiates a rendering of content associated with the user, an event host, one or more items associated with the event host, or a combination thereof at a sensing device that detects the presence signal. Still further, the system determines a response of the user to the content based on movement information, location information, transaction information, or a combination thereof associated with the transmitting object, the user, or a combination thereof during the event.

20 Claims, 10 Drawing Sheets

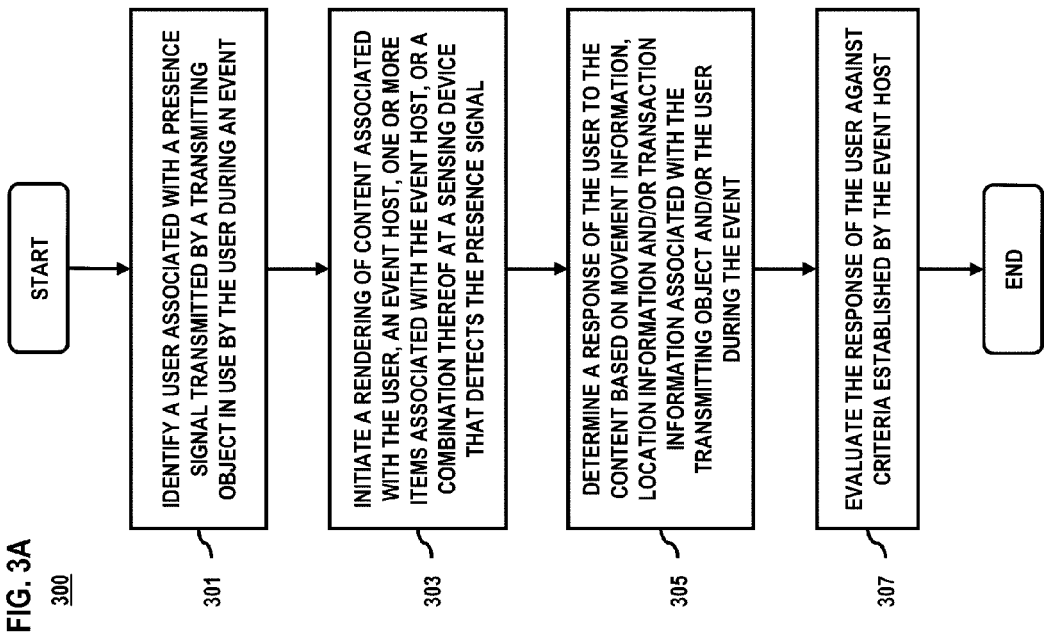

320

316

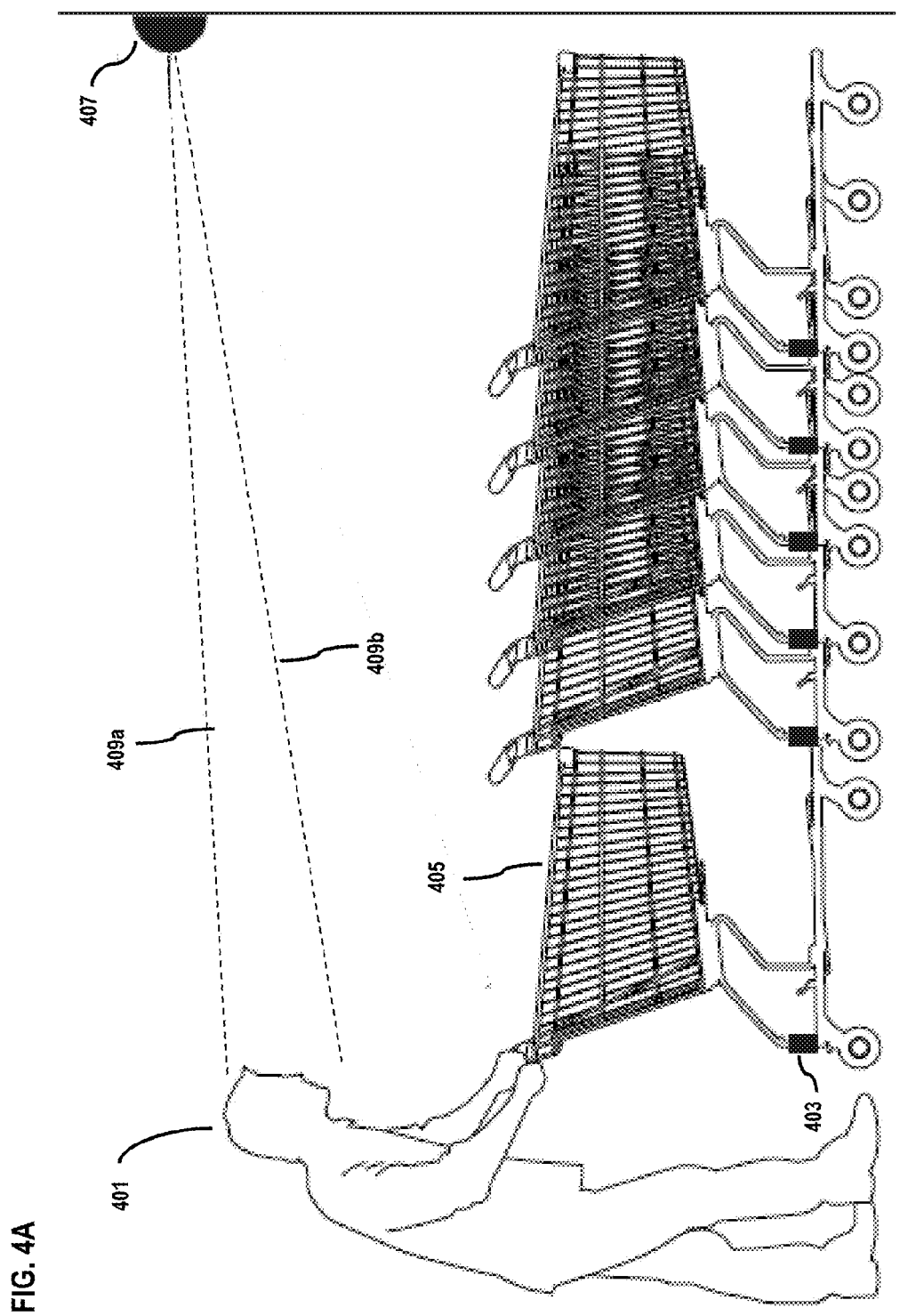

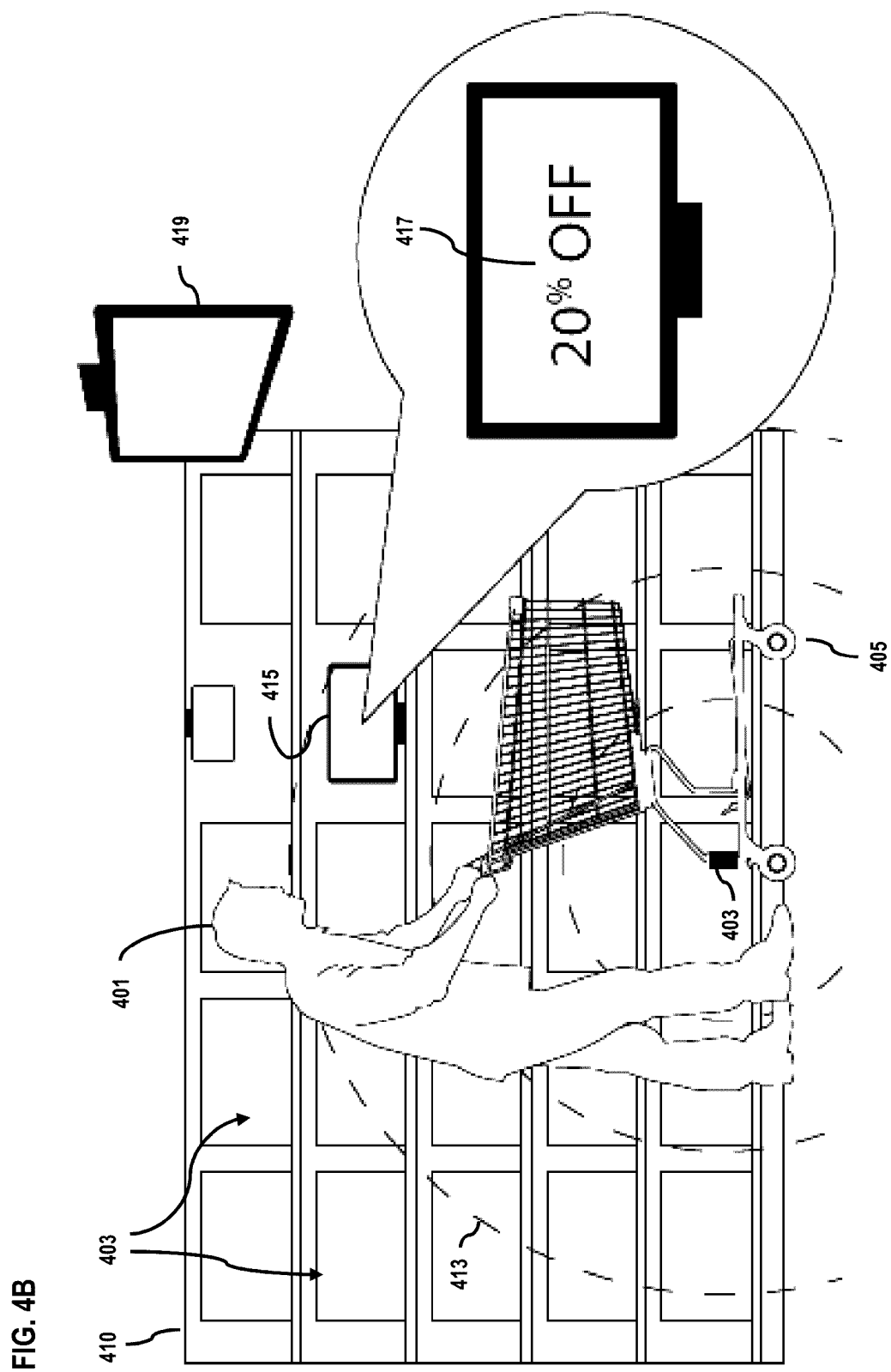

600

METHOD AND SYSTEM FOR EVALUATING A USER RESPONSE TO A PRESENCE BASED ACTION

BACKGROUND INFORMATION

Service providers are continually challenged to deliver value and convenience to consumers by providing compelling network services and advancing the underlying technologies. One area of interest has been automating the execution of certain device actions based on the proximity of users to a presence sensing device, i.e., a device capable of detecting presence signals. By way of example, a display device may be configured to detect a presence signal broadcast by a user's mobile device as they walk towards the display. Under this scenario, the display may detect the identity or presence of the user and present targeted content to the user. Unfortunately, the user has to opt-in prior to being able to interact with the presence sensing device, thus requiring them to provide identity information and likely reducing their participation. Moreover, there is currently no convenient means of determining a level of effectiveness of the automated device action performed by the presence sensing device in response to the presence signal.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3D are flowcharts of processes for determining a level of effectiveness of a device action performed in response to the presence of a user, according to various embodiments;

FIGS. 4A-4D are diagrams of a user interacting with the presence platform, according to various embodiments;

DESCRIPTION OF THE PREFERRED EMBODIMENT

An apparatus, method and software for determining a level of effectiveness of a device action performed in response to the presence of a user is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to the rendering of content based on the determined presence of a user, it is contemplated these embodiments have applicability to any automated device actions. This may include, for example, the execution of purchase transactions, the activating or deactivating of electronics, machinery and various computing devices, the generating of reports, or the like.

Figure 1:
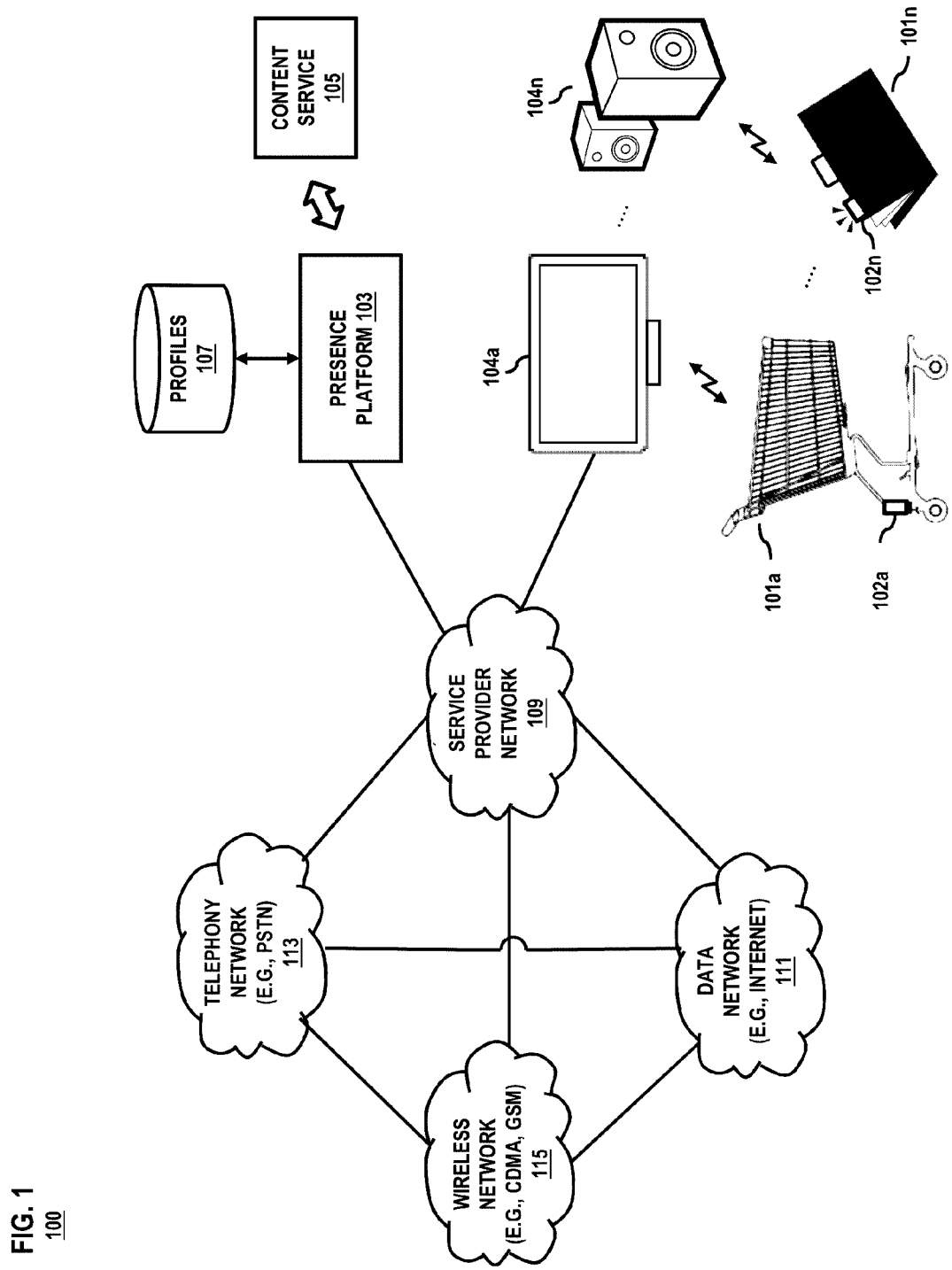
FIG. 1 is a diagram of a system for determining a level of effectiveness of a device action performed in response to the presence of a user, according to one embodiment.

FIG. 1 is a diagram of a system for determining a level of effectiveness of a device action performed in response to the presence of a user, according to one embodiment. For the purpose of explanation herein, the presence of the user may be determined based on the transmission of presence or location based signals by a transmitting device of the user. The signals may be any short range or low energy signals conforming to a specific messaging protocol, such as Bluetooth, Ultra Wideband (UWB), Induction Wireless or Near Field Communication (NFC). These signals may be transmitted intermittently or persistently by the transmitting device as "open air" broadcast messages for conveying the identity of the user associated with the transmitting device, a current location or proximity of the transmitting device, a current status of the transmitting device or user, a willingness or availability of the user to engage in communication with other devices, referred to herein as sensing devices, capable of detecting/sensing the broadcast signals, etc.

As noted previously, in certain implementations, sensing devices may be configured to perform various device actions in response to the detection of presence signals from a transmitting device of a user. For example, in the case where the transmitting device is a mobile phone, a display system capable of sensing presence signals may be caused to present target advertisements to the user as the user walks towards the display. As another example, a point-of-sales system configured to detect presence signals may automatically retrieve coupon information or payment information relating to the user based on their proximity to the checkout are for finalizing a purchase transaction at a store. As yet another example, a sales kiosk featuring one or more audio devices for detecting the presence of a user may retrieve and subsequently render audio advertisements of nearby items on sale. Hence, various device actions may be programmatically implemented for direct or indirect execution by sensing devices in response to the detection of the presence of users.

In certain instances, the transmitting device may be a standalone device or integrated for use within another object i.e., as a transmitting object. For example, a transmitter may be contained within a wristband to be worn by a user, attached to a key chain, etc. As such, any object capable of being transported by a user may serve the purpose of transmitting presence signals; thus enabling the transmitting object to be employed as the user engages in shopping, attends a concert or meeting, or participates in any other event. Unfortunately, the user has to opt-in prior to interacting with the presence sensing device. As a result, the user is forced to provide identifying information to the provider of the presence sensing device, which may jeopardize their anonymity and reduce the likelihood of participation.

Furthermore, in the case where the sensing device is the user's mobile device (e.g., their smartphone), the user must be looking at the device display in order to notice any content being rendered as their device interacts with various transmitters. Unfortunately, this requires the user to be looking at their mobile device display as opposed to the event host's items (e.g., products for sale).

Still further, while various implementations and automated executions are capable of being performed based on the determined presence of a user, there is currently no convenient means of identifying the response of users to the action. For example, the owner of a store (e.g., an event host) that has transmitters placed throughout a venue may not be able to determine the response of a user to a particular advertisement rendered to a display. Still further, the event host may not be able to identify the resulting movement patterns or purchase activities of the user as a result of the automated action. There is currently no convenient, direct or near real-time means of determining the quality or effectiveness of the action.

To address this issue, system 100 presents a presence platform 103 that is configured to operate in connection with one or more sensing devices 104a-104n, referred to herein collectively as sensing devices 104. In one embodiment, the presence platform 103 executes various instructions for managing the interaction between the sensing devices 104 and various transmitting devices 102a-102n (referred to herein collectively as transmitters 102) employed by of one or more users during an event. For the purpose of illustration herein, the event may be a meeting, concert, shopping, recreation, driving or any other activity, excursion or the like to be participated in by the user at a designated location and/or with respect to a certain venue. The event host may be any person or group thereof that facilitate, sponsor or is associated with the event or one or more items (e.g., purchase items) made available to users at the event. It is noted, therefore, that the event host and/or any affiliates thereof, including various third-party content service providers, may employ the presence platform 103 accordingly for supporting interaction between users and sensing devices 104 based on the determined presence of users at the event. The presence platform 103 enables the user to interact with the sensing devices 104 anonymously, thus allowing for but not requiring the exchange of identification information between the transmitters 102 and the sensing devices 104.

In one embodiment, the sensing devices 104 may have integrated therein circuitry, sensors and/or an operating system for detecting presence signals transmitted by nearby compatible transmitters 102. As such, the presence platform 103 may execute one or more application programming interfaces (APIs) for interacting with the sensing devices 104. The sensing devices 104 may include a display device (e.g., device 104a), an audio device (e.g., device 104n), a fixed or portable terminal including a display device, interactive sales terminal, digital kiosk, a multimedia tablet, Internet node, communicator, desktop computer, laptop computer, or any combination thereof. It is also contemplated that the sensing devices 104 may support any type of interface for exchanging presence data. In addition, sensing devices 104 may facilitate various input means for receiving and generating information, including touch screen capability, keyboard and keypad data entry, voice-based input mechanisms and the like. Any known and future implementations of sensing devices 104 are applicable or any other electronic device for rendering media content to users.

In one embodiment, the sensing devices 104 may be selectively placed throughout the event venue by an event host for detecting the presence of users as they navigate an event. For example, the host of a convention held at a meeting facility may place several presence detection capable display devices (e.g., device 104a) at different locations throughout the hallways and in the meeting rooms. The sensing devices 104 may interact with a transmitting object associated with the user during the event. Under this scenario, the displays may present meeting schedule information or room assignment details to specific users as they walk about the hallways or approach a meeting room. A first user may be presented with meeting schedule information pertaining to their agenda while a second user is presented with speaker notes regarding the meeting in which they are the guest speaker. It is noted the first and second users may be presented with personal content based on an opt-in or personal identification information sharing procedure performed with respect to the event host.

As another example, a third (anonymous) user may be presented with general meeting agenda information—i.e., content not specific to them but related to the overall event. Still further, the third user may be presented with menu information regarding a restaurant within proximity of the user. Under this scenario, the third (anonymous) user may be a conference attendee that chose to opt-out of sharing personal identification information with the sensing devices 104. As such, the presence signals generated by the transmitters 102 do not include identifying information regarding the user. Also, per this scenario, the user may choose to forgo any biometric analysis or other personal identification procedures during the event. It is noted, therefore, that the presence platform 103 may support interaction between the sensing devices 104 and transmitters 102 regardless of the identification information sharing preferences of the user.

In one embodiment, the transmitters 102 may be integrated for use in connection with an object capable of being transported by the user as they participate in an event. This may include, for example, a shopping cart 101a, a folder 101n, a shopping basket, a keychain, a table reservation placard, a ticket, a wristband, or the like. For the purpose of illustration, such objects related to the event or event host are referred to herein collectively as transmitting objects 101—i.e., objects having a direct or indirect ability to broadcast presence signals. The transmitting objects 101 may be employed by users as they participate in the event. As such, it is noted that the transmitting objects 102 and sensing devices 104 may be provided by the event host or an affiliate thereof for use by users during the event.

In one embodiment, the sensing devices 104 and transmitters 102 conform to a common messaging protocol for enabling transmitter-to-receiver interaction and awareness. By way of example, a transmitting object (e.g., shopping cart 101a) that transmits low energy beacon signals during a shopping event can only be detected by a sensing device 104 configured to detect and interpret beacon signals, i.e., those conforming to the iBeacon protocol. Under this scenario, for example, the beacon signal advertises/broadcasts the following information in Table 1 as a low energy Bluetooth message:

TABLE 1

| Field | Size | Description |
| --- | --- | --- |
| Unique User Identifier (UUID) | 16 bytes | A unique identifier specific to the user, the transmitting object 101, the transmitter 102, etc. The UUID assignment may vary depending on the transmitter 102 usage scenario. |
| Major | 2 bytes | Further specifies a sub-region (e.g., proximity range) within a larger region to which the transmitter corresponding to the UUID is bound/associated. |
| Minor | 2 bytes | Allows further subdivision of a region (e.g., proximity range) |

In the example above, the UUID, major and minor values provide the identifying information for a broadcast iBeacon signal along with the range detection requirements to be executed with respect to the signal. In the case of the latter, a major range or region may correspond to a transmission radius X while a minor range may correspond to a smaller transmission radius Y. It is noted the radius may define a proximity condition to be met in order to enable presence detection between the transmitting object 101 and the sensing device 104.

When the sensing device 104 detects the beacon signal, it uses the strength of the signal to determine whether the proximity condition of the transmitting object is met as well as the accuracy of its estimation of proximity. The stronger the signal, the more confident the sensing device 104 is about the proximity condition being met. The weaker the signal, the less confident the sensing device 104 is about the proximity condition being met. For the purpose of illustration, the strength of the beacon signal may be classified by the sensing device 104 as shown in Table 2:

TABLE 2

| Proximity State | Description |
| --- | --- |
| Immediate | This proximity state indicates a high level of confidence that the sensing device 104 is physically very close to the transmitting object 101 broadcasting the beacon signal. |
| Near | This proximity state indicates a proximity of a certain number of meters. |
| Far | This proximity state indicates the transmitting object 101 can be detected but the confidence in the accuracy is too low to determine either "Near" or "Immediate." |
| Unknown | The proximity of the transmitting object 101 cannot be determined. This may indicate that proximity detection has just begun or that there are insufficient measurements to determine the proximity state. |

It is noted that various other short range protocols and presence detection approaches may be employed. Similarly, different range/proximity state categorization approaches may be employed depending on the protocol being employed.

In one embodiment, the sensing device 104 interacts with the presence platform 103 in response to receipt of a presence signal. For example, the sensing device 104 may submit a notification to the presence platform 103 for indicating the presence of a transmitting object, i.e., by way of a communication network (e.g., a service provider network 109). The notification may specify a device identifier of the sensing device 104, a host identifier of the event host associated with the sensing device 104, a network identifier, etc. Once received, the presence platform 103 authenticates the sensing device 104 and/or event host accordingly based on credentials maintained in a profile database 107. It is noted that the credentials may be established by the event host in advance, such as during an initial subscription or registration process with the presence platform 103. As such, the event host may define the various sensing devices 104, event locations, users, accounts, etc., to be managed by the presence platform 103 in response to the detection of presence signals.

In one embodiment, the presence platform 103 processes presence signals in order to identify the user associated with the transmitting object 104. This may include, for example, determining whether the user identifier (e.g., UUID) specified corresponds to existing user profile information maintained by the beacon platform 103. The profile information may be maintained in a profile database 107 of the beacon platform 103 and may include, for example, a reference to the user identifier, name or handle information, historic transaction information, historic movement information, etc. In another embodiment, the identity of the user may be determined based on biometric authentication means. For example, upon entry to an event, a designated scanning device, video camera or voice recorder of the event host may gather facial image data, iris data, voice data or other user characteristic data. This data may then be processed by the presence platform 103 via any known data recognition techniques for identifying a match with the user.

Alternatively, in the case where no profile information exists, the presence platform 103 assigns a user identifier to the transmitting object 101. This corresponds to the scenario wherein no prior association or history exists between the user of the transmitting object 101 and the event and/or event host. Once assigned, the presence platform 103 transmits the user identifier to the sensing device 104 that received the presence signal of the unidentified transmitting object 101. The sensing device 104 then transmits the user identifier to the transmitting object 101 for storage to the transmitter 102. As a result of this execution, subsequent presence signals broadcast by the transmitting object 101 specify the user identifier during the shopping event.

Still further, in certain embodiments, biometric information regarding the user may be gathered by the presence platform 103 in conjunction with various data collection devices of the event host for establishing user identification information. For example, upon entry of a user to a grocery store or during retrieval of a shopping cart equipped with a transmitter 102, the presence platform 103 may gather facial image data, iris data, voice data or other user characteristic data via a designated scanning device, video camera or voice recorder. This data may then be stored as profile information in association with a newly assigned user identifier (e.g., UUID).

It is noted the above described assignment procedure may be performed during first time use of the transmitting object 101 by a user. For example, in the case where the event host is the owner of a grocery store and the user is a first time visitor, the above described assignment process may be performed. In addition, the assignment procedure may be performed in connection with a transaction performed by the user. For example, in the case where the user makes a purchase via a point of sale system, payment information, name information or other data related to the purchase may be associated with an assigned user identifier and stored to the profile database 107.

In certain embodiments, the transmitter 102 may be activated or deactivated based on the current level of use of the transmitting object 101 (e.g., active or inactive). The transmitter 102 may also be activated or deactivated based on the determined movement of the user, the navigation of the user to a destination point (e.g., a cart storage area, a checkout area, a location of a display device) during the event, a duration of time of the movement, a duration of time of the user at the destination point, etc. The activation or deactivation may correspond to a period of time of monitoring of the presence, movement or activity of the user by the presence platform 103 during the event. It may also correspond to a period of active or inactive powering or use of the transmitter 102 of a respective transmitting object 102.

In one embodiment, the presence platform 103 initiates a rendering of content to a sensing device 104 in response to the determined presence of a user within proximity of the sensing device 104. By way of example, the content may include music, videos, advertisements, coupons, instructions or any other form or type of media capable of being rendered by a display device 104a, a speaker system 104n, a computing device, a mobile device, etc. Under this scenario, the presence platform 103 retrieves the content from a content service 105, i.e., a cloud service or any other resource associated with the event host.

By way of example, when the user is exercising at a gymnasium equipped with presence detection enabled equipment, the presence platform 103 may identify the user by way of a transmitting wristband. Under this scenario, the transmitting wristband may broadcast presence signals as the user approaches an elliptical machine. Per the specified user identifier, the presence platform 103 determines a preferred/historical machine setting of the user and renders these settings to the control device of the elliptical machine automatically; thus requiring no manual adjusting of the machine. As another example, the presence platform 103 may cause the rendering of specific movie or television content to a video display configured to the elliptical machine. The presence platform 103 may select the content based on a historical preference of the user for the content, a target or predicted preference of the user, etc. Still further, the content may be retrieved by the presence platform 103 from a third party movie or television content service.

It is noted that the time of rendering or execution of the content may be based on the extent of proximity of the user to the sensing device, movement information regarding the user, etc. For example, video content to be rendered to a presence detection enabled display device may be timed for execution when the user is within x feet of the display. Similarly, the rate of playback of the video content may be increased or decreased based on the proximity or rate of movement of the user as they walk away from or towards the display. The presence platform 103 may further select different content to be presented based on a determined or predicted variation in proximity, movement, activity or perceived interest of the user.

In one embodiment, the presence platform 103 may be configured to monitor and subsequently evaluate the response of users to the rendered content. The evaluation may be performed against criteria established by the event host (or content provider) for indicating the effectiveness of the content rendered. Per the criteria, the presence platform 103 may evaluate a current response/behavior of the user to the rendered content and generate evaluation report results. For example, the criteria may specify a minimum or target purchase amount or a preferred item type or quantity thereof that is considered favorable to the event host. As another example, the criteria may correspond to a preferred stop duration (lack of movement) of the user for a given duration of content. Under this scenario, a user stop duration of 10 seconds for a 30 second advertisement may be considered more favorable than only a 4 second stop; thus indicating the receptivity of the user to the content.

In another example, the criteria may correspond to a desired movement pattern of the user about an event location. Under this scenario, the movement pattern of the user may be determined based on the analysis of changing timestamp information, proximity information and location information associated with the presence signals transmitted by the transmitting object 101. The movement pattern may then be compared to the desired or expected pattern by the event host or content provider to determine if the behavior of the user correlates. Based on this, an effectiveness of the rendered content to induce the user to visit certain destination points, i.e., a location of a particular purchase item, the sales desk, checkout, etc., may be determined. It is noted, in certain embodiments, that the evaluation may be generated as one or more reports for use by the event host or content provider. It is further noted that the reports may be generated in near real time for providing immediate feedback to the event host.

In one embodiment, the presence platform 103 may dynamically adapt the content or mode of rendering of subsequent content while the user is at the event based on the evaluated response of the user to a first rendering of content. For example, the presence platform 103 may evaluate transaction information generated with respect to the user to determine if items presented as content are actually purchased. In the case where the user purchases an item, the presence platform 103 may subsequently render upsell related content (e.g., content related to add-ons products or additional features of the purchased item) to a display device during the event. Under this approach, the upsell content is presented based on the evaluation results indicating a favorable response of the user to the prior content, with the intention of inducing the user to make additional purchases while at the store.

While the above described executions pertain to the rendering of content, it is further noted that the presence platform 103 may enable the rendering or execution of other actions by a sensing device. For example, in the case where the sensing device 104 is an automated vehicle system, the presence platform 103 may initiate execution of instructions for the system to guide the vehicle to a favorite restaurant location of the user in response to determining the approach of the user to the vehicle. As another example, the presence platform 103 may adjust the light settings within a certain room of a home in response to the sensing of the presence of the user by a lighting controller at the home. Hence, the "rendering" action of the presence platform 103 is not limited to only content but to any instructions or executions for enabling automated device action.

It is noted that the presence platform 103 may interface directly with the various sensing devices 104 as well as other systems of the event host such as a point of sales system, terminal node, transport system, etc. Under this scenario, the presence platform 103 may physically reside at the location of the event or venue as a hub or server device for submitting control signals directly to respective sensing devices 104. Alternatively, the control platform 103 may be implemented as a platform or network hosted solution for initiating a rendering of content at a sensing device 104, such as via a network connection (e.g., via a service provider network 109). For example, the presence platform 103 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 105 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
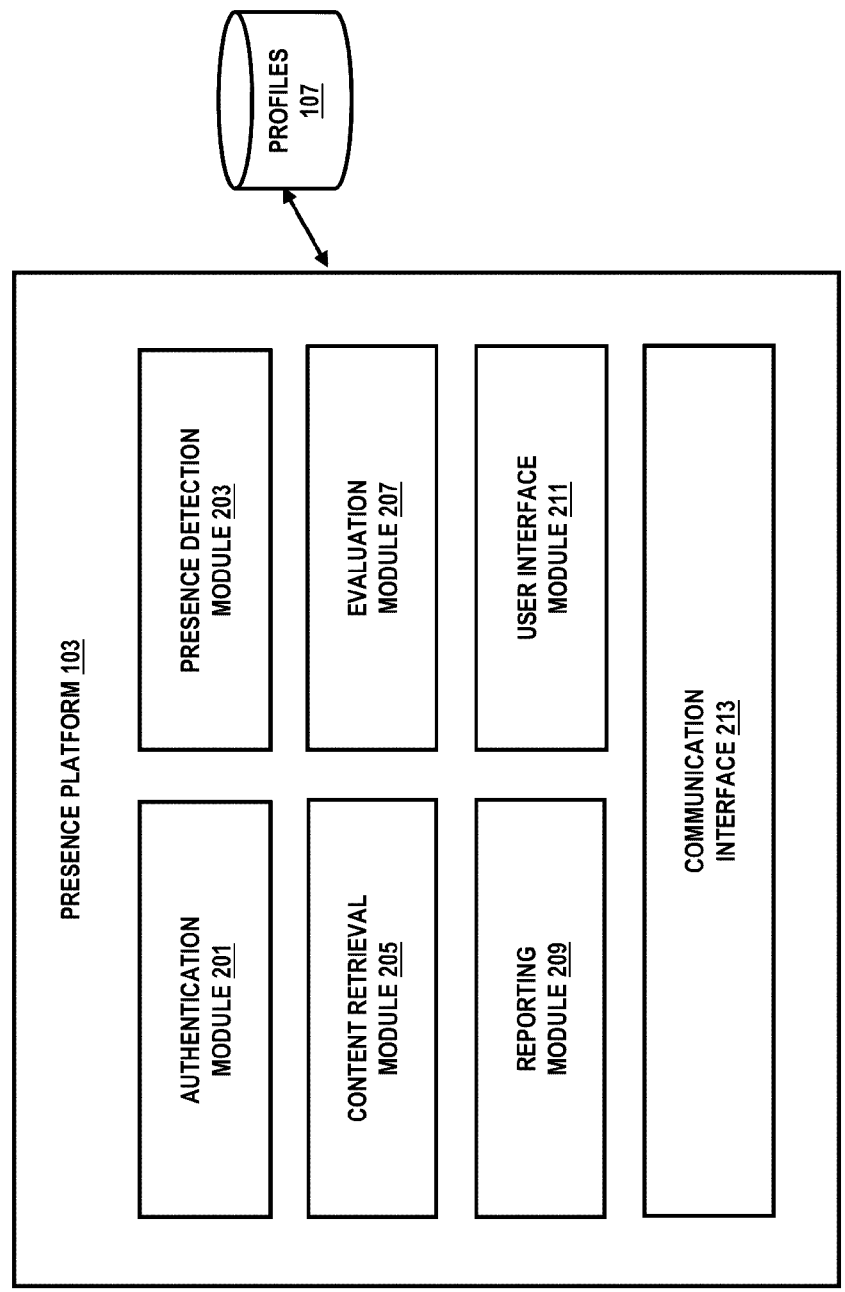
FIG. 2 is a diagram of a presence platform, according to one embodiment.
Figure 3D:
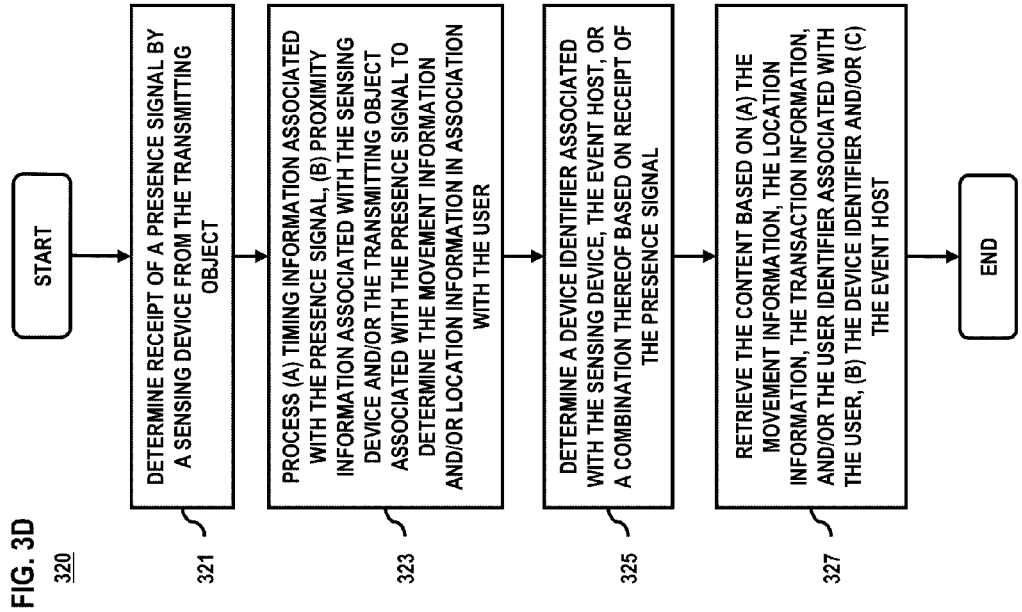
Figure 3C:
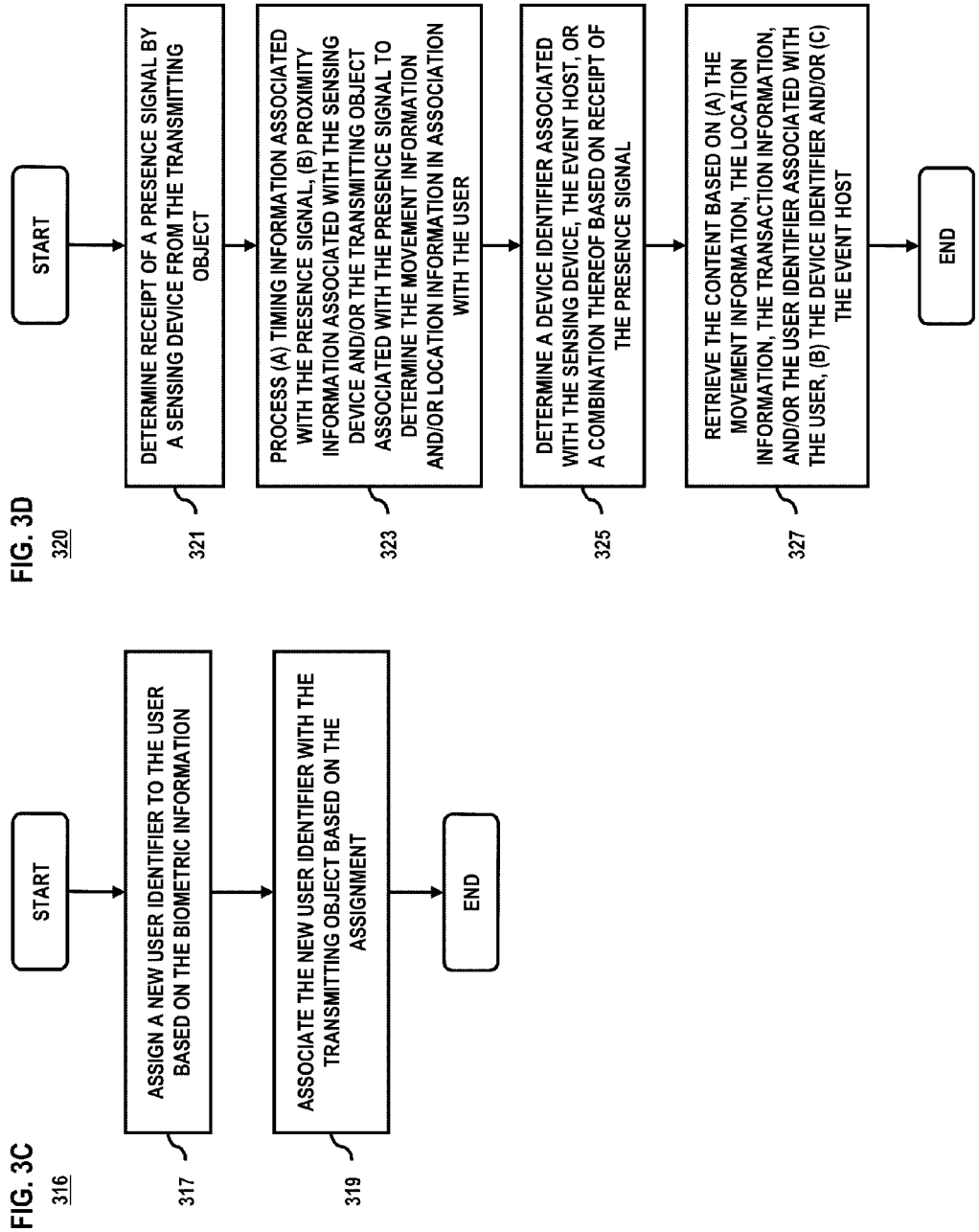

FIG. 2 is a diagram of a presence platform, according to one embodiment. The presence platform 103 includes various executable modules for performing one or more computing, data processing and network based instructions that in combination provide a means for determining a level of effectiveness of a device action performed in response to the presence of a user. Such modules can be implemented in hardware, firmware, software, or a combination thereof. By way of example, the presence platform 103 may include an authentication module 201, a presence detection module 203, a content retrieval module 205, an evaluation module 207, a reporting module 209, a user interface module 211 and a communication interface 213. In addition, the presence platform 103 may also access profile information 107 for enabling execution of the various modules 201-213.

In one embodiment, an authentication module 201 authenticates sensing devices 104 for interaction with the presence platform 103. One or more content services may also be authenticated for interaction accordingly. By way of example, the authentication module 201 receives a request from an event host to initially subscribe/register to the platform 103 for enabling the rendering of content based on the presence of users during an event. This may include establishing credentials of the event host, a range of unique user identifiers to be assigned to one or more transmitters 102 of the event host, payment credentials or the like. These credentials may be stored to the profile database 107 in connection with the event host, the event, or a combination thereof, as one or more event host profiles. Similarly, one or more user profiles of established users of transmitting objects 101 associated with the event host may also be stored to the database 107 during the subscription/registration process.

The authentication module 201 may also receive a notice message for indicating the transmission of a presence signal by a transmitting object 101 (or transmitter 102 thereof) to one of the sensing devices 104 associated with the event host. Once this notification is received, the authentication module 201 alerts the presence detection module 203. In one embodiment, the presence detection module 203 analyzes the presence detection signal or contents thereof, in order to determine an identity of the user. This may include comparing the user identifier information specified per the signal against profile information 107 to determine if the user is known or unknown to the event host. This may include, for example, processing biometric data gathered in connection with the user, processing a unique user identifier specified by the signal, or a combination thereof. In addition, the presence detection module 203 may determine whether a proximity status condition is met with respect to the user of the transmitting object 101.

When a match is found between the user and an existing profile and a proximity condition is met, the presence detection module 203 transmits a notification message to the sensing device 104 via the communication interface 213. The notification message alerts the sensing device 104 that the transmitting object 101 is associated with a known user and that the sensing device 104 may interact with the transmitting object 101 during the event.

When no match is found between the user and an existing profile, even when the proximity condition is met, the presence detection module 203 assigns a unique identifier to the user and creates a new profile accordingly. Alternatively, the module 203 may submit a notification message (e.g., via the communication interface 213) to one or more biometric data gathering devices of the event host for facilitating the gathering and storing of biometric data associated with the user. Once gathered, the module 203 assigns a user identifier to the data and creates a profile accordingly. It is noted that the communication interface may execute various application programming interfaces (APIs) for supporting communication between the presence platform 103 and the various sensing devices or other systems of the event host.

In one embodiment, the content retrieval module 205 retrieves content from a content service 105 based on the determined identity and presence of a user. The content is retrieved based on the current location, movement or activity of the user during the event. In addition, the content retrieval module 205 may also process historical transaction, activity, movement, item preference details, or other information regarding the user for selecting content to be retrieved and subsequently rendered by a sensing device 104. It is noted that the content retrieval module 205 may access one or more criteria, or rules, established by the event host for determining the retrieval of content. The content may include music, videos, advertisements, coupons, instructions or any other form or type of media capable of being rendered by a display device, a speaker system, a computing device, a mobile device, etc. Under this scenario, the content service 105 may be a cloud service or any other resource associated with the event host.

In one embodiment, the evaluation module 207 evaluates the response of users to the content retrieved by the content retrieval module 205 and subsequently rendered by the sensing device 104. The evaluation may be performed against criteria established by the event host (or content provider) for indicating the effectiveness of the content rendered. Per the criteria, the presence platform 103 may evaluate a current response/behavior of the user to the rendered content and generate evaluation report results. For example, the criteria may specify (a) a duration of viewing, interacting with, or a combination thereof of the content, (b) a purchase, selection, or a combination thereof of at least one of the items, (c) a duration, a path, or a combination thereof of movement of the transmitting object, the user, or a combination thereof, or (d) an arrival of the transmitting object, the user, or a combination thereof to a destination point associated with the event host, or (e) a combination thereof during the event. Under this scenario, the destination point may correspond to a preferred location of the event or venue thereof, including a cart storage area, a sales kiosk, a checkout line, a location of a sensing device, a specific room, an aisle, a service counter, an order area, etc.

In one embodiment, the evaluation module 207 may operate in connection a reporting module 209 to generate reports for indicating the evaluation results. The evaluation may be generated as one or more reports for use by the event host or content provider. In certain instances, the report may be generated and sent to the event host or content service provider via the communication interface as a notification message, an email communication, or the like. Alternatively, the reporting module 209 may operate in connection with a user interface module 2011 for enabling the presentment of the report and results thereof to the event host or content service provider via a graphical user interface. In the latter case, the reports may be generated in near real time for providing immediate feedback to the event host; thus enabling the event host to make adjustments to the placement of one or more purchase items, a mode of operations of the event, the arrangement of the venue, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 6:
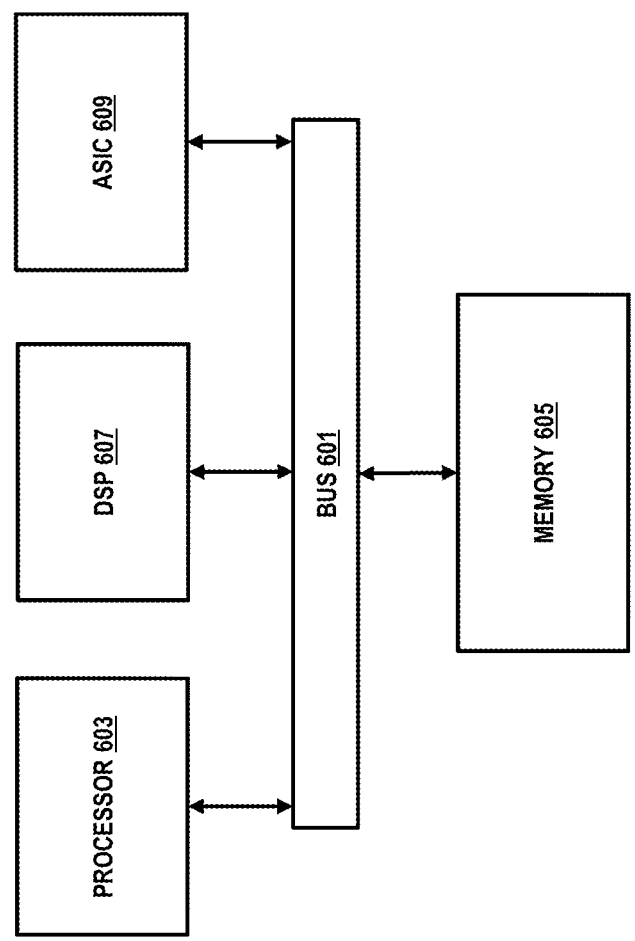
FIG. 6 is a diagram of a chip set that can be used to implement an embodiment of the invention.

FIGS. 3A-3D are flowcharts of processes for determining a level of effectiveness of a device action performed in response to the presence of a user, according to various embodiments. In one embodiment, the presence platform 103 performs the processes 300, 308, 316 and 320, and are implemented in, for instance, a chip set including a processor and a memory as shown in FIG. 6.

In step 301 of process 300 (FIG. 3A), the presence platform 103 identifies a user associated with a presence signal transmitted by a transmitting object in use by the user during an event. The transmitting object may be any object featuring a transmitter for generating presence signals that can be carried or transported by the user during an event. In another step 303, the platform 103 initiates a rendering of content associated with the user, an event host, one or more items associated with the event host, or a combination thereof at a sensing device that detects the presence signal. In another step 305, the platform 103 determines a response of the user to the content based on movement information, location information, transaction information, or a combination thereof associated with the transmitting object, the user, or a combination thereof during the event.

In step 307 of process 306 (FIG. 3B), the presence platform 103 evaluates the response of the user against criteria established by the event host. The criteria may specify various rules or conditions for indicating a level of effectiveness of the response/behavior of the user relative to the rendering of content. As noted previously, the response, the criteria, or a combination thereof includes (a) a duration of viewing, interacting with, or a combination thereof of the content, (b) a purchase, selection, or a combination thereof of at least one of the items, (c) a duration, a path, or a combination thereof of movement of the transmitting object, the user, or a combination thereof, or (d) an arrival of the transmitting object, the user, or a combination thereof to a destination point associated with the event host, or (e) a combination thereof during the event.

In step 309 of process 308 (FIG. 3B), the presence platform 103 captures biometric information associated with the user during the event, during an initial use of the transmitting object, or a combination thereof. The biometric information includes facial characteristic information, fingerprint information, eye characteristic information, voice information, or a combination thereof. In another step 311, the platform 103 determines a match between the user and the user identifier based on the biometric information. Per step 313, the presence platform 103 associates the user identifier with the transmitting object based on the match. The associating includes assigning, transmitting, storing, or a combination thereof of the user identifier to the transmitting object and the identifying of the user is based on the user identifier. By way of example, the user identifier may correspond to a unique user identifier value (e.g., UUID) established per the specific presence signal transmission protocol employed by the transmitter 102 of the transmitting object.

In step 315, the presence platform 103 determines history information associated with the user for specifying (a) a historic response of the user to the content, other content, or a combination thereof, (b) a historic purchase, selection, or a combination thereof of an item associated with the content, other content, or a combination thereof, (c) a historic movement of the user during the event, another event, or a combination thereof, or (d) a combination thereof based on the match. As noted previously, the rendering of the content is based on the history information. For example, the content retrieved in association with the user may vary depending on the historic tendencies, activities, behaviors, transaction patterns, etc., wherein content determined best suited for inducing a favorable user action based on their history is preferred by the event host.

In step 317 of process 316 (FIG. 3C), the presence platform 103 assigns a new user identifier to the user based on the biometric information. In another step 319, the platform 103b associates the new user identifier with the transmitting object based on the assignment. As noted previously, the new user identifier is assigned by the event host and the associating includes storing the new user identifier to the transmitting object. Assigning of the new user identifier may correspond to a first time use of the transmitting object by the user with respect to the event or event host.

In step 321 of process 320 (FIG. 3D), the presence platform 103 determines receipt of a presence signal by a sensing device 104 from the transmitting object 101 (e.g., or transmitter 102 thereof). In step 323, the platform 103 processes (a) timing information associated with the presence signal, (b) proximity information associated with the sensing device, the transmitting object, or a combination thereof, or (c) a combination thereof associated with the presence signal to determine the movement information, location information, or a combination thereof in association with the user. Hence, as noted previously, the presence signals may be analyzed by the platform 103 to determine the user response and may include observing variations in certain user actions over time. Also, the sensing device is positioned by the event host to detect the presence signal when the transmitting object, the user, or a combination thereof is within a predetermined proximity of the sensing device during the event.

In step 325, the presence platform 103 determines a device identifier associated with the sensing device, the event host, or a combination thereof based on receipt of the presence signal. In another step 327, the platform 103 retrieves the content based on (a) the movement information, the location information, the transaction information, the user identifier, or a combination thereof associated with the user, (b) the device identifier, (c) the event host, or (d) a combination thereof. As noted previously, the content is an advertisement, an instruction, media, a transaction report, or a combination thereof associated with at least one of the items, the event host, or a combination thereof and the sensing device is a display, a point-of-sale system, a media device, a whiteboard, or a combination thereof of the event host.

FIGS. 4A-4D are diagrams of a user interacting with the presence platform, according to various embodiments. For the purpose of illustration herein, the diagrams are described with respect to an exemplary use case of a user 401 shopping at a store. The event host (e.g., store owner) employs the use of various sensing devices, such as display devices 407 and 409, which are configured to operate in connection with the platform 103 for rendering content and evaluating the response of the user to said content.

In FIG. 4A, when the user 401 arrives at the store, he proceeds to the shopping cart parking area in order to acquire a shopping cart 405. The shopping cart 401 is configured with a transmitter 403 for broadcasting presence signals for detection by sensing devices within the store that are within proximity to the user 401. In this case, the transmitter 403 is in an inactive or low power state pending an association between the user 401 and the shopping cart 405/transmitter 403. This corresponds to a period of time in which the transmitter does not broadcasting any presence signals nor is there any active monitoring and tracking of the response of the user to content per the presence platform 103.

As the user retrieves a shopping cart 405, a camera system 407 near the cart parking area captures an image of the user's face, as represented by scan lines 409a and 409b. The presence platform 103 may be configured to perform biometric analysis of the captured image independently or in conjunction with an in-store biometric security system. Under this scenario, the biometric analysis reveals a match between the user 401 and an existing shopping history and profile for the user. In addition, the platform determines an existing user identifier corresponding to the user. As a result, the platform initiates transmission of the existing user identifier for this user 401 to the transmitter 403. It is noted that this may correspond to transmission of an activation signal by the presence platform for placing the transmitter 403 into an active state. Alternatively, the platform may initiate a request for the camera device 407, a security system (not shown), a point of sales terminal, or other device associated with the event host to activate the transmitter 403.

In FIG. 4B, the user 401 proceeds to walk down different aisles of the store to view the items 403 available for purchase. One of the aisles features a display shelf 410, which further presents different purchase items 403 on different shelves. In addition, some of the shelves feature presence detecting enabled display devices (e.g., device 415) along with an overhead display device 419 positioned towards the end of the aisle. As the transmitter 403 is now actively broadcasting presence signals (e.g., radiating signals 413), the display devices 415 and 419 detect the presence of the user 401 within close range and alerts the presence platform 103. Once the user identifier is determined, the platform 103 initiates the retrieval of content related to the user 401.

Under this scenario, the presence platform 103 is able to determine (per the user's existing profile) that the user is a preferred customer in good standing, has a tendency to purchase items 403 in bulk and typically spends an average of $123.57 every time they visit the store. Based on this, the content 417 retrieved and subsequently caused to be rendered to the display device 415 as the user 401 proceeds down the aisle is a coupon for a 20% discount on purchase items 403. Intrigued by the offer, the user stops for a duration of time x and inspects the items 403 to decide if he wants to purchase them. He then places a quantity of the items into the shopping cart 405 and proceeds towards the end of the display/aisle, where another display device 419 presents an advertisement (not shown) for a related product available in the next aisle over. As in the case with the discount content 417, the response of the user 401 to the advertisement content rendered via display device 419 is also monitored by the presence platform 103.

Figure 4C:
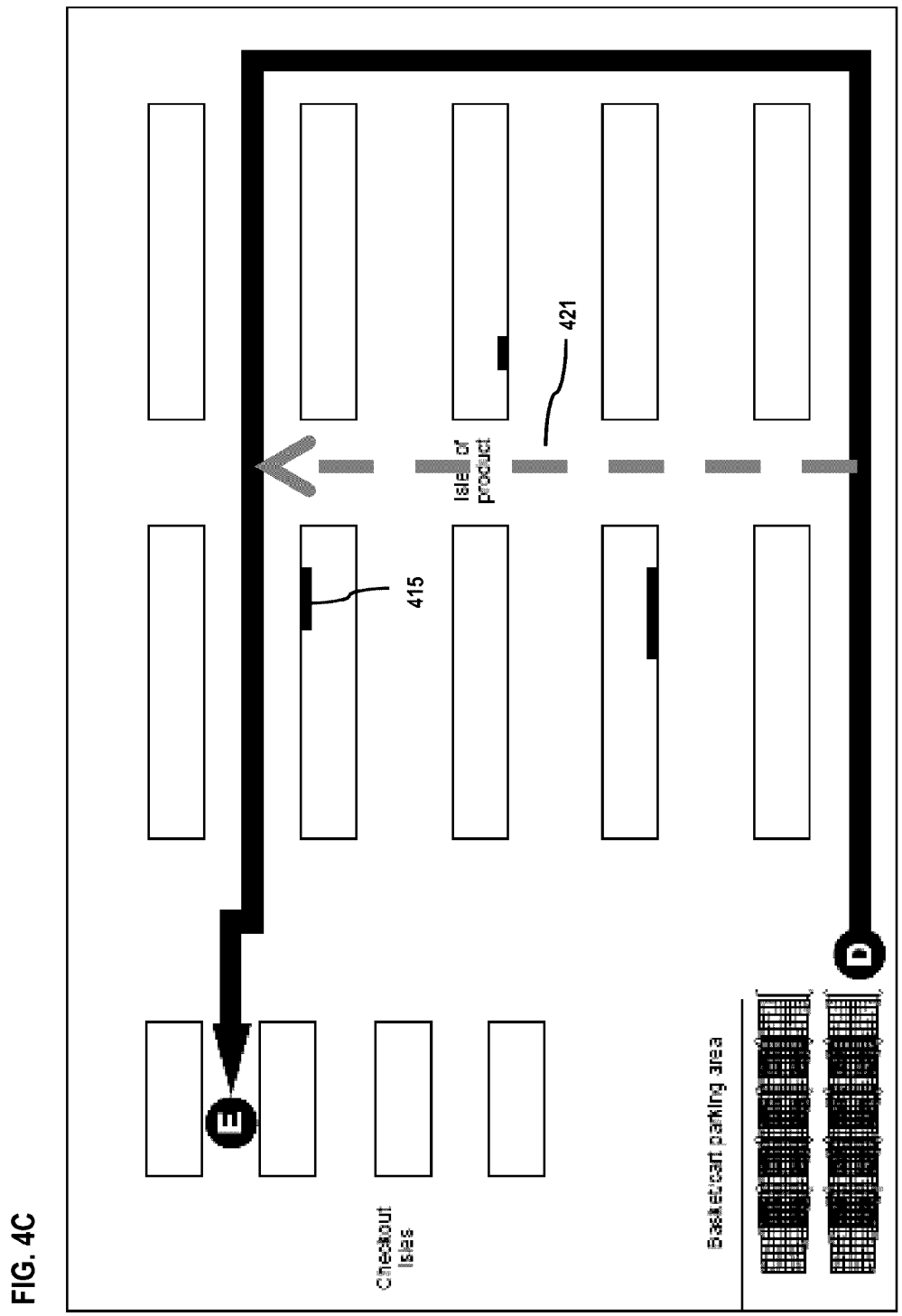

In FIG. 4C, the presence platform 103 tracks the movement, transactions and any other activities of the user during the shopping event. For example, the movement of the user 401 is represented by a line having a starting point corresponding a to shopping cart dispatch point D to an ending point E corresponding to the checkout area. In this example, the user travels about various aisles, some of which are equipped with display devices (e.g., display device 415). The presence platform 103 continuously analyzes the presence signals 413 transmitted throughout the shopping event for the user 401. Resultantly, the platform 103 is able to track the starts and stops engaged by the user based on timestamp and time-to-signal information as exchanged between the transmitter 403 and the sensing devices (e.g., device 415). In addition, the platform 103 records which items or aisles seem to be of most interest to the user 401 based on the level of activity of user with the content (e.g., user responded to a touch screen input request) or the duration of time spent in the aisle. Still further, the platform 103 may interact with the point of sales system at the checkout area E of the store for correlating purchase transactions with the various items, aisles or destination points deemed of interest to the user 401.

For the purpose of illustration, a dashed line 421 is shown to depict a preferred movement of the user as established by the event host. In this scenario, the route is preferred given the placement of the various display devices throughout the store; the middle aisle corresponding to the dashed line 421 representing the route where the presence signals may most likely result in the rendering of content for presentment to the user. In contrast, the route taken by the user shows that the user ended up avoiding/missing most of the sensing devices and therefore missed some content during their shopping. This activity may be monitored for the user as well as other users and generated into an evaluation report for subsequent review by the event host. Based on this phenomenon, the event host may decide to change the placement of items along the various aisles to maximize the likelihood of popular items being viewed in connection with the display devices, can adapt the placement of the display devices, or the like. Hence, it is noted that the persistent monitoring of the user shopping session enables post-event analysis and refinement. In certain instances, the report results may also be presented dynamically to the event host for enabling real-time adjustments to be made.

Figure 4D:
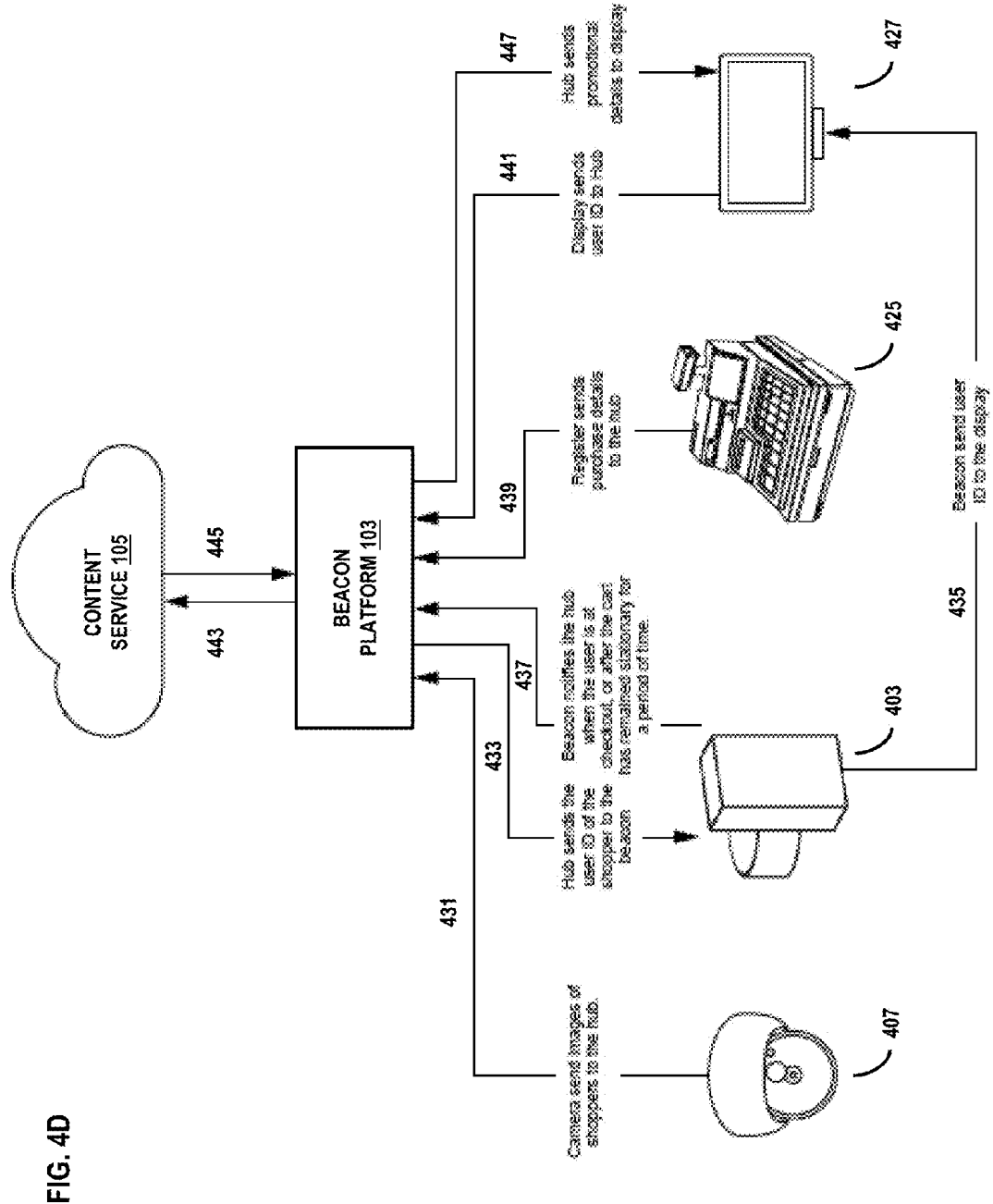

In FIG. 4D, the interaction between the presence platform 103 and the various systems and sensing devices of the store is depicted. In this case, the camera system 407 sends images, or other biometric data, to the presence platform 103 for user identification or identifier assignment processing, corresponding to step 431. Once the user identifier is determined or assigned, the presence platform 103 initiates transmittal of the user identifier to the corresponding transmitter 403 that is to be employed by the user, corresponding to step 433. In this example, the transmitter 403 is a beacon device for transmitting beacon signals.

As the user navigates about the venue (e.g., store), the beacon device continuously broadcasts beacon signals to the various sensing devices (e.g., display 427) placed throughout the event, per step 435. In addition, the beacon device 403 may also send notification messages to the presence platform 103 for indicating the current activity of the user, including when the user is at the checkout area, the activity or inactivity of the shopping cart, etc., per step 437. It is noted, in certain embodiments, that the transmitter may also provide status information periodically to the presence platform 103 directly for indicating a movement, presence, transactional occurrence, or other activity of the user during the event.

In the case where the user makes a purchase of an item at checkout, the point of sale system 425 may be configured to send purchase detail and transaction information to the presence platform 103 per step 439. This information may then be stored to the user profile as a transaction record in association with the specified user identifier. In addition, the presence platform may generate an evaluation report based on the transaction results, the movement patterns, or other activities of the user as well as other users that visited the store for subsequent review by the event host.

In step 441, the display device 427 sends the user identifier specified per the beacon signal of step 435 to the presence platform 103 to initiate content retrieval. In response, the platform 103 submits a request for specific content to relate to the user and retrieves this content accordingly, corresponding to steps 443 and 445 respectively. Once retrieved, the presence platform sends the content to the requesting display device 427, where it is rendered to the display for presentment to the user accordingly, corresponding to step 447. Per this interaction, the presence platform 103 is able to manage the experience of the user as well as enable consistent evaluation of the user response by the event host.

The processes described herein for determining a level of effectiveness of a device action performed in response to the presence of a user may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
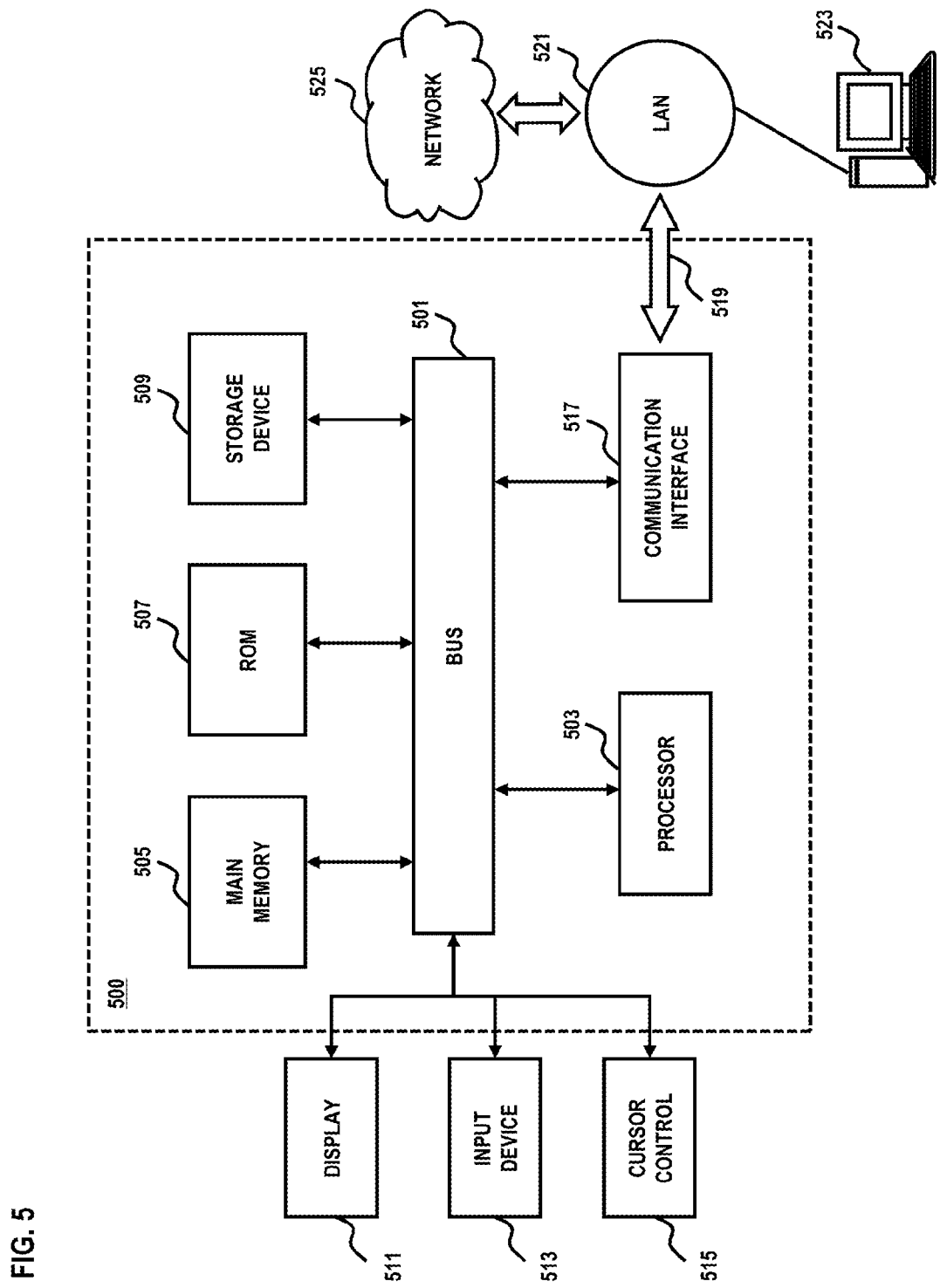
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 2, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to determine a level of effectiveness of a device action performed in response to the presence of a user as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of determining a level of effectiveness of a device action performed in response to the presence of a user.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to determine a level of effectiveness of a device action performed in response to the presence of a user. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The invention claimed is:

1. A method comprising:
identifying a user associated with a presence signal transmitted by a transmitting object in use by the user during an event;
initiating a rendering of content associated with the user, an event host, one or more items associated with the event host, or a combination thereof at a sensing device that detects the presence signal;
determining a response of the user to the content based on movement information, location information, transaction information, or a combination thereof associated with the transmitting object, the user, or a combination thereof during the event;
capturing biometric information associated with the user during the event, during an initial use of the transmitting object, or a combination thereof,
wherein the biometric information includes facial characteristic information, fingerprint information, eye characteristic information, voice information, or a combination thereof;
determining a match between the user and a user identifier based on the biometric information; and
associating the user identifier with the transmitting object based on the match,
wherein the associating includes assigning, transmitting, storing, or a combination thereof of the user identifier to the transmitting object and the identifying of the user is based on the user identifier.

2. The method of claim 1, further comprising:
evaluating the response of the user against criteria established by the event host,
wherein the response, the criteria, or a combination thereof includes (a) a duration of viewing, interacting with, or a combination thereof of the content, (b) a purchase, selection, or a combination thereof of at least one of the items, (c) a duration, a path, or a combination thereof of movement of the transmitting object, the user, or a combination thereof, or (d) an arrival of the transmitting object, the user, or a combination thereof to a destination point associated with the event host, or (e) a combination thereof during the event.

3. The method of claim 1, further comprising
determining history information associated with the user for specifying (a) a historic response of the user to the content, other content, or a combination thereof, (b) a historic purchase, selection, or a combination thereof of an item associated with the content, other content, or a combination thereof, (c) a historic movement of the user during the event, another event, or a combination thereof, or (d) a combination thereof based on the match,
wherein the rendering of the content is based on the history information.

4. The method of claim 1, further comprising:
determining receipt of a presence signal by a sensing device from the transmitting object; and
processing (a) timing information associated with the presence signal, (b) proximity information associated with the sensing device, the transmitting object, or a combination thereof, or (c) a combination thereof associated with the presence signal to determine the movement information, location information, or a combination thereof in association with the user,
wherein the sensing device is positioned by the event host to detect the presence signal when the transmitting object, the user, or a combination thereof is within a predetermined proximity of the sensing device during the event.

5. The method of claim 4, further comprising:
determining a device identifier associated with the sensing device, the event host, or a combination thereof based on receipt of the presence signal; and
retrieving the content based on (a) the movement information, the location information, the transaction information, the user identifier, or a combination thereof associated with the user, (b) the device identifier, (c) the event host, or (d) a combination thereof,
wherein the content is an advertisement, an instruction, media, a transaction report, or a combination thereof associated with at least one of the items, the event host, or a combination thereof and the sensing device is a display, a point-of-sale system, a media device, a whiteboard, or a combination thereof of the event host.

6. The method of claim 1, wherein the transmitting object includes a beacon device.

7. A method comprising:
identifying a user associated with a presence signal transmitted by a transmitting object in use by the user during an event;
initiating a rendering of content associated with the user, an event host, one or more items associated with the event host, or a combination thereof at a sensing device that detects the presence signal;
determining a response of the user to the content based on movement information, location information, transaction information, or a combination thereof associated with the transmitting object, the user, or a combination thereof during the event;
capturing biometric information associated with the user during the event, during an initial use of the transmitting object, or a combination thereof,
wherein the biometric information includes facial characteristic information, fingerprint information, eye characteristic information, voice information, or a combination thereof;
assigning a new user identifier to the user based on the biometric information; and
associating the new user identifier with the transmitting object based on the assignment,
wherein the new user identifier is assigned by the event host and the associating includes storing the new user identifier to the transmitting object.

8. The method of claim 7, further comprising:
evaluating the response of the user against criteria established by the event host,
wherein the response, the criteria, or a combination thereof includes (a) a duration of viewing, interacting with, or a combination thereof of the content, (b) a purchase, selection, or a combination thereof of at least one of the items, (c) a duration, a path, or a combination thereof of movement of the transmitting object, the user, or a combination thereof, or (d) an arrival of the transmitting object, the user, or a combination thereof to a destination point associated with the event host, or (e) a combination thereof during the event.

9. The method of claim 7, further comprising:
determining receipt of a presence signal by a sensing device from the transmitting object; and
processing (a) timing information associated with the presence signal, (b) proximity information associated with the sensing device, the transmitting object, or a combination thereof, or (c) a combination thereof associated with the presence signal to determine the movement information, location information, or a combination thereof in association with the user,
wherein the sensing device is positioned by the event host to detect the presence signal when the transmitting object, the user, or a combination thereof is within a predetermined proximity of the sensing device during the event.

10. The method of claim 7, further comprising:
determining history information associated with the user for specifying (a) a historic response of the user to the content, other content, or a combination thereof, (b) a historic purchase, selection, or a combination thereof of an item associated with the content, other content, or a combination thereof, (c) a historic movement of the user during the event, another event, or a combination thereof, or (d) a combination thereof,
wherein the rendering of the content is based on the history information.

11. The method of claim 7, wherein the transmitting object includes a beacon device.

12. An apparatus comprising a processor configured to:
identify a user associated with a presence signal transmitted by a transmitting object in use by the user during an event;
initiate a rendering of content associated with the user, an event host, one or more items associated with the event host, or a combination thereof at a sensing device that detects the presence signal;
determine a response of the user to the content based on movement information, location information, transaction information, or a combination thereof associated with the transmitting object, the user, or a combination thereof during the event;
capture biometric information associated with the user during the event, during an initial use of the transmitting object, or a combination thereof,
wherein the biometric information includes facial characteristic information, fingerprint information, eye characteristic information, voice information, or a combination thereof;
determine a match between the user and a user identifier based on the biometric information; and
associate the user identifier with the transmitting object based on the match,
wherein the associating includes assigning, transmitting, storing, or a combination thereof of the user identifier to the transmitting object and the identifying of the user is based on the user identifier.

13. The apparatus of claim 12, wherein the processor is further configured to:
evaluate the response of the user against criteria established by the event host,
wherein the response, the criteria, or a combination thereof includes (a) a duration of viewing, interacting with, or a combination thereof of the content, (b) a purchase, selection, or a combination thereof of at least one of the items, (c) a duration, a path, or a combination thereof of movement of the transmitting object, the user, or a combination thereof, or (d) an arrival of the transmitting object, the user, or a combination thereof to a destination point associated with the event host, or (e) a combination thereof during the event.

14. The apparatus of claim 12, wherein the processor is further configured to:
determine history information associated with the user for specifying (a) a historic response of the user to the content, other content, or a combination thereof, (b) a historic purchase, selection, or a combination thereof of an item associated with the content, other content, or a combination thereof, (c) a historic movement of the user during the event, another event, or a combination thereof, or (d) a combination thereof based on the match,
wherein the rendering of the content is based on the history information.

15. The apparatus of claim 12, wherein the processor is further configured to:
determine receipt of a presence signal by a sensing device from the transmitting object; and
process (a) timing information associated with the presence signal, (b) proximity information associated with the sensing device, the transmitting object, or a combination thereof, or (c) a combination thereof associated with the presence signal to determine the movement information, location information, or a combination thereof in association with the user,
wherein the sensing device is positioned by the event host to detect the presence signal when the transmitting object, the user, or a combination thereof is within a predetermined proximity of the sensing device during the event.

16. The apparatus of claim 15, wherein the processor is further configured to:
determine a device identifier associated with the sensing device, the event host, or a combination thereof based on receipt of the presence signal; and
retrieve the content based on (a) the movement information, the location information, the transaction information, the user identifier, or a combination thereof associated with the user, (b) the device identifier, (c) the event host, or (d) a combination thereof,
wherein the transmitting object includes a beacon device and the content is an advertisement, an instruction, media, a transaction report, or a combination thereof associated with at least one of the items, the event host, or a combination thereof and the sensing device is a display, a point-of-sale system, a media device, a whiteboard, or a combination thereof of the event host.

17. An apparatus comprising a processor configured to:
identify a user associated with a presence signal transmitted by a transmitting object in use by the user during an event;
initiate a rendering of content associated with the user, an event host, one or more items associated with the event host, or a combination thereof at a sensing device that detects the presence signal;
determine a response of the user to the content based on movement information, location information, transaction information, or a combination thereof associated with the transmitting object, the user, or a combination thereof during the event;
capture biometric information associated with the user during the event, during an initial use of the transmitting object, or a combination thereof, wherein the biometric information includes facial characteristic information, fingerprint information, eye characteristic information, voice information, or a combination thereof;

assign a new user identifier to the user based on the biometric information; and associate the new user identifier with the transmitting object based on the assignment, wherein the new user identifier is assigned by the event host and the associating includes storing the new user identifier to the transmitting object.

18. The apparatus of claim 17, wherein the processor is further configured to:

evaluate the response of the user against criteria established by the event host, wherein the response, the criteria, or a combination thereof includes (a) a duration of viewing, interacting with, or a combination thereof of the content, (b) a purchase, selection, or a combination thereof of at least one of the items, (c) a duration, a path, or a combination thereof of movement of the transmitting object, the user, or a combination thereof, or (d) an arrival of the transmitting object, the user, or a combination thereof to a destination point associated with the event host, or (e) a combination thereof during the event.

19. The apparatus of claim 17, wherein the processor is further configured to:

determine receipt of a presence signal by a sensing device from the transmitting object; and process (a) timing information associated with the presence signal, (b) proximity information associated with the sensing device, the transmitting object, or a combination thereof, or (c) a combination thereof associated with the presence signal to determine the movement information, location information, or a combination thereof in association with the user, wherein the sensing device is positioned by the event host to detect the presence signal when the transmitting object, the user, or a combination thereof is within a predetermined proximity of the sensing device during the event.

20. The apparatus of claim 17, wherein the processor is further configured to:

determine history information associated with the user for specifying (a) a historic response of the user to the content, other content, or a combination thereof, (b) a historic purchase, selection, or a combination thereof of an item associated with the content, other content, or a combination thereof, (c) a historic movement of the user during the event, another event, or a combination thereof, or (d) a combination thereof, wherein the rendering of the content is based on the history information.

* * * * *